United States Patent
Zhang et al.

(10) Patent No.: US 11,419,101 B2
(45) Date of Patent: *Aug. 16, 2022

(54) SYSTEMS AND METHODS FOR AUTOMATIC CAMERA INSTALLATION GUIDE (CIG)

(71) Applicant: ZEBRA TECHNOLOGIES CORPORATION, Lincolnshire, IL (US)

(72) Inventors: Yan Zhang, Buffalo Grove, IL (US); Kevin J. O'Connell, Palatine, IL (US); Jay J. Williams, Glenview, IL (US); Lichen Wang, Malden, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/080,436

(22) Filed: Oct. 26, 2020

(65) Prior Publication Data

US 2021/0136750 A1 May 6, 2021

Related U.S. Application Data

(63) Continuation of application No. 16/670,446, filed on Oct. 31, 2019, now Pat. No. 10,820,307.

(51) Int. Cl.
*G06T 17/10* (2006.01)
*G06T 7/60* (2017.01)
(Continued)

(52) U.S. Cl.
CPC ....... *H04W 72/0413* (2013.01); *H04L 1/0003* (2013.01); *H04L 5/0055* (2013.01); *H04W 72/1284* (2013.01); *H04W 72/14* (2013.01); *H04W 28/26* (2013.01); *H04W 72/04* (2013.01); *H04W 72/1263* (2013.01)

(58) Field of Classification Search
None
See application file for complete search history.

(56) References Cited

U.S. PATENT DOCUMENTS 10,762,331 B1* 9/2020 Zhang ................ G06Q 10/083
10,820,307 B2* 10/2020 Zhang ............... H04W 72/1284
(Continued)

*Primary Examiner* — Tize Ma

(57) ABSTRACT

Three-dimensional (3D) depth imaging systems and methods are disclosed for assessing an orientation with respect to a container. A 3D-depth camera captures 3D image data of a shipping container. A container feature assessment application determines a representative container point cloud and (a) converts the 3D image data into 2D depth image data; (b) compares the 2D depth image data to one or more template image data; (c) performs segmentation to extract 3D point cloud features; (d) determines exterior features of the shipping container and assesses the exterior features using an exterior features metric; (e) determines interior features of the shipping container and assesses the interior features using an interior features metric; and (f) generates an orientation adjustment instruction for indicating to an operator to orient the 3D-depth camera in a second direction for use during a shipping container loading session, wherein the second direction is different than the first direction.

12 Claims, 12 Drawing Sheets
(8 of 12 Drawing Sheet(s) Filed in Color)

(51) Int. Cl.

| | |
|---|---|
| *H04W 72/04* | (2009.01) |
| *H04W 72/12* | (2009.01) |
| *H04W 72/14* | (2009.01) |
| *H04L 1/00* | (2006.01) |
| *H04L 5/00* | (2006.01) |
| *H04W 28/26* | (2009.01) |

(56) References Cited

U.S. PATENT DOCUMENTS

| | | | |
|---|---|---|---|
| 2008/0246759 A1* | 10/2008 | Summers | G06T 7/579 345/420 |
| 2009/0262974 A1* | 10/2009 | Lithopoulos | G01C 21/206 382/100 |
| 2015/0213646 A1* | 7/2015 | Ma | G06T 7/50 345/420 |
| 2015/0254499 A1* | 9/2015 | Pang | G06T 7/001 382/103 |
| 2017/0178333 A1* | 6/2017 | Zhang | G06Q 10/083 |
| 2018/0147062 A1* | 5/2018 | Ay | A61F 2/30942 |
| 2019/0166339 A1* | 5/2019 | De La Cruz | G06T 5/006 |

\* cited by examiner

SYSTEMS AND METHODS FOR AUTOMATIC CAMERA INSTALLATION GUIDE (CIG)

CROSS-REFERENCE TO RELATED APPLICATIONS

This application is a continuation of U.S. patent application Ser. No. 16/670,446, filed on Oct. 31, 2019, now U.S. Pat. No. 10,820,307, which is incorporated herein by reference in its entirety.

BACKGROUND OF THE INVENTION

In the transportation industry, shipping containers (e.g., shipping containers as used in air and/or ground transportation and shipping, such as unit load devices (ULDs)) are typically loaded using a variety of different techniques that take into account a variety of different sizes and configurations of boxes, packages, or other items for shipping or transit. In addition, shipping containers, themselves, typically have various sizes and storage capacities (e.g., where such shipping containers are constructed to handle different cargo sizes, loads and/or configurations). Correspondingly, a major point of emphasis in the transportation/shipping industry is performing high fidelity analytics concerning the loading of such containers.

Traditional analytics systems feature a camera (e.g., a load monitoring unit (LMU)) positioned at a designated loading point. These cameras will capture images of shipping containers placed at the designated loading point to facilitate analytics of the loading procedures used to load each container. However, problems arise from such traditional analytics systems.

For example, accurate camera (e.g., LMU) orientation is essential for analytical algorithms, such as ULD fullness algorithms, to achieve acceptable performance. LMUs are traditionally oriented upon installation through manual analysis of previously captured images. Thus, the traditional orientation process is very time consuming and inaccurate due to the inherent inaccuracies associated with human visual image inspection. Moreover, large-scale installations may involve orienting dozens of LMUs, which can quickly compound these inefficiencies.

Several conventional techniques attempt to solve these problems. Each, however, has specific drawbacks. For example, a direct 3D matching technique may be employed to match a target point cloud to a 3D template point cloud. However, the direct 3D matching technique is not robust in that it lacks stable and repeatable results, is also sensitive to partial structures, and involves in high computation complexity. In addition, the matching is not accurate, which generally leads to erroneous and generally inaccurate reporting.

Another conventional technique includes point cloud clustering. Point cloud clustering, however, is also not robust as it lacks stable and repeatable results, in particular, it suffers from uncontrollable 3D data segmentation results. The point cloud clustering technique is additionally sensitive to "noise" (e.g., loaders/personnel moving through the loading area) and small object interference (e.g., a package being moved within the loading area). Because of this, point cloud clustering typically creates incorrect clustering results due to loader and package interference.

Accordingly, various problems generally arise regarding how to dynamically configure camera orientation automatically, efficiently, and accurately during installation. Thus, there is a need for three-dimensional (3D) depth imaging systems and methods for dynamic camera orientation configuration that allow for fast and efficient real-time orientation assessments for camera installation.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
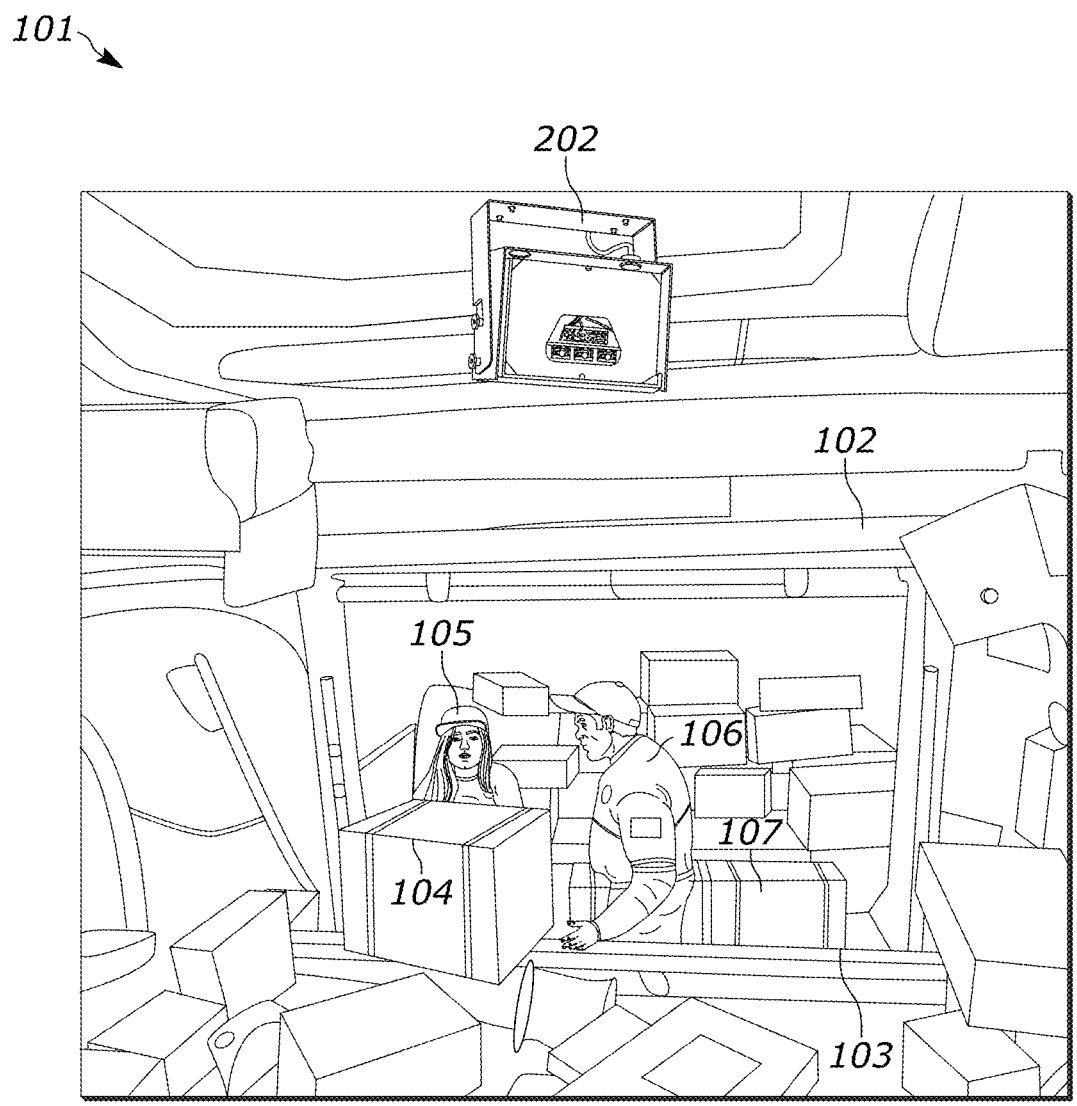
FIG. 1 is a perspective view, as seen from above, of a predefined search space of a loading facility that depicts a load monitoring unit (LMU) having a 3D camera oriented in a first direction to capture 3D image data of a shipping container located in a space, in accordance with example embodiments herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Accordingly, systems and methods are described herein that provide automatic assessment of orientations with respect to containers for LMU installation. The systems and methods described herein replace conventional manual LMU installation processes by automatically providing highly accurate LMU orientation information to analytical algorithms in real-time. The present disclosure proposes an efficient, accurate, and robust approach to dynamically orient LMUs during installation to improve the efficiency and accuracy of the LMU installation process when compared to known analytical algorithms.

In addition, the present disclosure describes inventive embodiments that eliminate adjustments to the LMU orientation based on visual assessments of captured images. In contrast to conventional systems and methods, which either provide unstable or otherwise uncontrollable results, the embodiments of the present disclosure produce consistent, accurate installation instructions. Without the benefits of the present disclosure, installation orientation efforts would remain substantial and tedious.

At a high level, the systems and methods of the present disclosure provide feedback to an LMU installer, and guide the LMU location/orientation to a good position that facilitates container loading analytics (CLA). The proposed method utilizes both a 3D point cloud and a 2D depth image template matching algorithm. For template selection, the point cloud of a complete ULD is selected as a template extraction source and converted to a depth image. A penalized least squares method is then used to fill up the missing data in the depth image. Afterwards, a specific area including a middle portion of the ULD contained in the depth image is chosen and cropped as the template for the corresponding matching process.

After a live image of the ULD is captured, the embodiments of the present disclosure include matching the preselected template with the live image. To facilitate this matching, the target point cloud is first converted to a depth image and then matched to the template. The matched area is then used to locate the ground and back-wall position in the scene. Following template matching, the 3D point cloud is segmented into a ground plane and a back wall based on the matching location. The segmented ground and back wall are fed to the plane regression pipeline where each plane parameter is estimated. The ULD front plane is then segmented based on known ULD dimensions.

For example, the ULD front plane is divided to several edges including a left, a right, and a top edge. By calculating the ratio of each edge, the completeness of the frontal structure can be quickly and robustly identified. Moreover, based on known assumptions, such as the left side wall is vertical to ground and the front panel, the systems and methods of the present disclosure may directly infer both the location and fit of the ULD left wall, right wall, and top ceiling planes. The occlusion ratio of the back wall to the front plane is then computed, and all six planes of the ULD container are localized to identify the bounding box of the container. Finally, the completeness of the ULD front panel and the occlusion of the back wall are computed to provide installation feedback to the installer.

The 3D depth imaging systems and methods disclosed herein may be further appreciated by the various Figures disclosed herein.

FIG. 1 is a perspective view, as seen from above, of a space 101 within a loading facility that depicts a load monitoring unit (LMU) having a 3D camera (e.g., a 3D-depth camera) oriented in a direction to capture 3D image data of a shipping container, in accordance with example embodiments herein. As depicted, shipping container 102 has a shipping container type of "AMJ." Generally, a shipping container is selected from one of several differently dimensioned containers. In various embodiments, shipping containers may comprise any type of unit load device (ULD). For example, a shipping container type may be of any ULD type, including, for example, any of an AMJ type, an AAD type, an AKE type, an AYY type, a SAA type, and APE type, or an AQF type. For ULD shipping containers, the first letter (e.g., "A" for "Certified aircraft container") indicates a specific type of ULD container, such as certified, thermal, etc., the second letter represents base size in terms of dimensions (e.g., "M" for 96×125 inch), and the third letter represents a side contour size and shape (e.g., "J" for a cube shaped ULD container having a diagonal sloping roof portion on one side only). More generally, however, a shipping container may be any aircraft-based shipping container.

The space 101 may be a predefined search space determined based on the shipping container size, dimensions, or otherwise configuration and/or the area in which the shipping area is localized. For example, in one embodiment, the predefined search space may be determined based on ULD type, shape, or position within a general area. As shown in FIG. 1, for example, the predefined search space is determined based on the size and dimensions of the shipping container 102 which is of type AMJ. In general, space 101 is defined so as to completely (or at least partially) include or image the shipping container. The space 101 may further include a frontal area 103 that generally defines a front position of the predefined search space and/or shipping container 102.

FIG. 1 additionally depicts, within space 101, personnel or loaders 105 and 106 that load packages 104 and 107 into the shipping container 102. In the embodiment of FIG. 1, shipping container 102 is being loaded by loaders 105 with packages 104 and 107 during a loading session. The loading session includes loading a set or group of identified packages into shipping container 102. The loaders 105 and 106 and packages 104 and 107, by movement through the space 101, may generally cause occlusion and interference with the 3D camera 202 (as discussed for FIG. 2) capturing 3D image data, over time, of shipping container 102. Thus, determining the correct orientation of the 3D camera 202 during installation is critical to ensure that improper installation does not further complicate the imaging difficulties posed by occlusion and interference during normal operations of a loading session.

Figure 2:
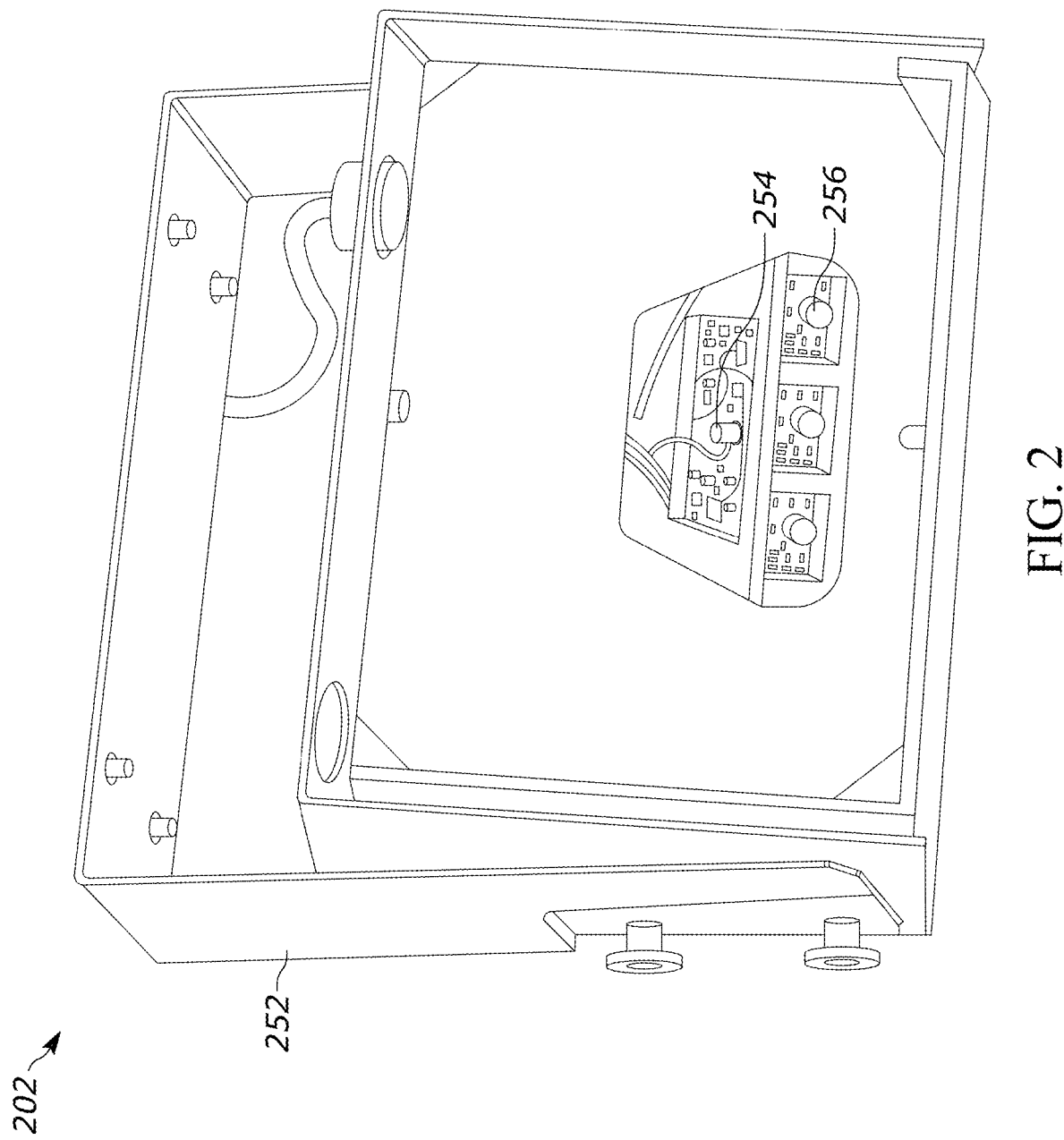
FIG. 2 is a perspective view of the LMU of FIG. 1, in accordance with example embodiments herein.

FIG. 2 is a perspective view of the LMU of FIG. 1, in accordance with example embodiments herein. In various embodiments, LMU 202 is a mountable device. Generally, an LMU 202 comprises camera(s) and a processing board and is configured to capture data of a loading scene (e.g., a scene including space 101). LMU 202 may run container fullness estimation and other advanced analytical algorithms.

LMU 202 may include a 3D camera 254 for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., space 101) or objects within the predefined search area, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of predefined search space 101. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the space 101 and any objects, areas, or surfaces therein.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time.

In various embodiments as described herein, LMU 202 may be a mountable device that includes a 3D camera for capturing 3D images (e.g., 3D image data/datasets) and a photo-realistic camera (e.g., 2D image data/datasets). The photo-realistic camera may be an RGB camera for capturing 2D images, such as the image of FIG. 1. LMU 202 may also include one or more processors and one or more computer memories for storing image data, and/or for executing apps that perform analytics or other functions as described herein. In various embodiments, and as shown in FIG. 1, the LMU 202 may be mounted within a loading facility and oriented in the direction of space 101 to capture 3D and/or 2D image data of shipping container 102. For example, as shown in FIG. 1, LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the space 101 to determine the 3D and 2D image data. The image data may be processed by the one or more processors and/or memories of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., space 101) are contemplated herein.

In some embodiments, for example, LMU 202 may process the 3D and 2D image data/datasets, as scanned or sensed from the 3D camera and photo-realistic camera, for use by other devices (e.g., server 301, as further described herein). For example, the one or more processors and/or one or more memories of LMU 202 may capture and/or process the image data or datasets scanned or sensed from space 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a container feature assessment app that may be, for example, installed and executing on a client device, for viewing, manipulation, or otherwise interaction. In other embodiments, the image data and/or the post-scanning data may be sent to a server (e.g., server 301 as further described herein) for storage or for further manipulation. For example, the image data and/or the post-scanning data may be sent to a server, such as server 301. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the container feature assessment app implemented on a client device.

LMU 202 may include a mounting bracket 252 for orienting or otherwise positioning the LMU 202 within a loading facility associated with space 101 as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices (such as server 301 of FIG. 3 as described herein). The network interface of LMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications.

Figure 3:
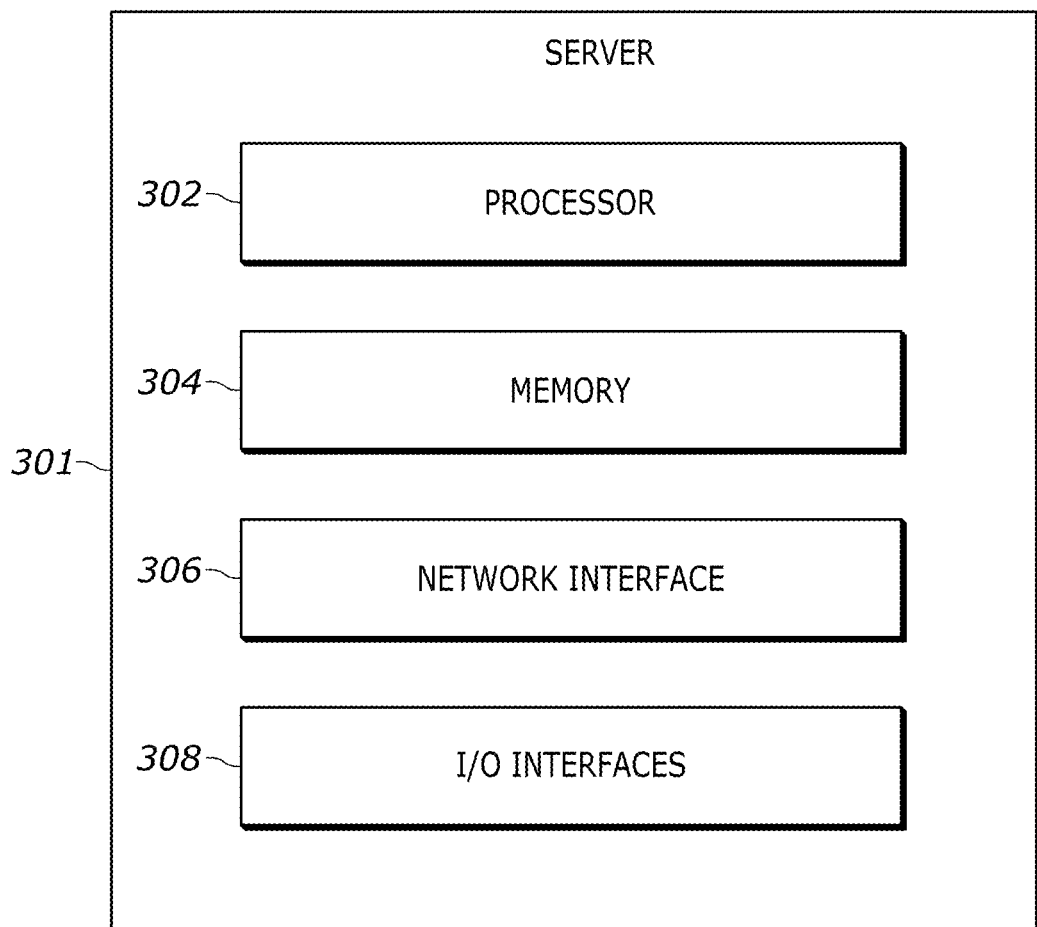
FIG. 3 is a block diagram representative of an embodiment of a server associated with the loading facility of FIG. 1 and the 3D camera of FIG. 2.

FIG. 3 is a block diagram representative of an embodiment of a server associated with the loading facility of FIG. 1 and the LMU 202 of FIG. 2. In some embodiments, server 301 may be located in the same facility as loading facility of FIG. 1. In other embodiments, server 301 may be located at a remote location, such as on a cloud-platform or other remote location. In either embodiment, server 301 may be communicatively coupled to a 3D camera (e.g., LMU 202).

Server 301 is configured to execute computer instructions to perform operations associated with the systems and methods as described herein, for example, implement the example operations represented by the block diagrams or flowcharts of the drawings accompanying this description. The server 301 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft.NET, or similar may also be used. As described below, the server 301 may be specifically configured for performing operations represented by the block diagrams or flowcharts of the drawings described herein.

The example server 301 of FIG. 3 includes a processor 302, such as, for example, one or more microprocessors, controllers, and/or any suitable type of processor. The example server 301 of FIG. 3 further includes memory (e.g., volatile memory or non-volatile memory) 304 accessible by the processor 302, for example, via a memory controller (not shown). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon.

The example server 301 of FIG. 3 may further include a network interface 306 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 301 of FIG. 3 includes input/output (I/O) interfaces 308 to enable receipt of user input and communication of output data to the user, which may include, for example, any number of keyboards, mice, USB drives, optical drives, screens, touchscreens, etc.

Figure 4:
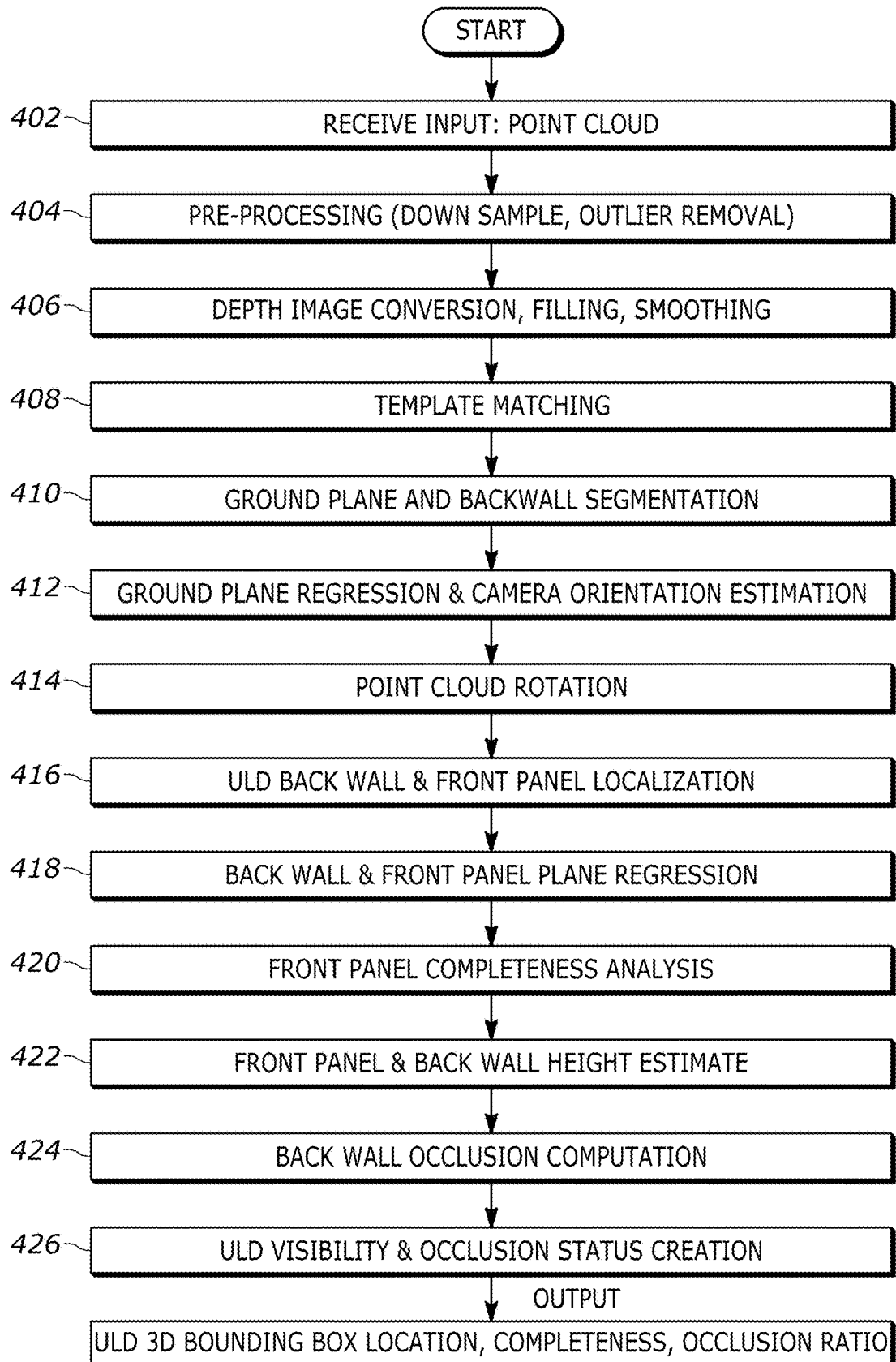
FIG. 4 is a flow chart for a 3D depth imaging algorithm for assessing an orientation with respect to a container, in accordance with example embodiments herein.

FIG. 4 is a flow chart for a 3D point cloud data process algorithm 400 for assessing an orientation with respect to a container, in accordance with example embodiments herein. Algorithm 400 describes various methods for automatic camera installation guidance, as described herein. Embodiments of the 3D point cloud data process algorithm 400 for automatic camera installation guidance of FIG. 4 are discussed below in context with FIGS. 5A-5B, 6A-6C, 7A-7B, 8A-8C, 9A-9B, 10, 11A-11B, and 12A-12B.

Generally speaking, the 3D point cloud data process algorithm 400 of FIG. 4 comprises three overarching stages. First, a 3D image of the container is acquired by the 3D camera and converted to a 2D image for further processing. The 3D image consists of a point cloud of data which is pre-processed consistent with the embodiments described herein. For example, the 3D point cloud data may be processed via methods such as down sampling and outlier removal to identify the relevant data in the 3D point cloud. The relevant 3D point cloud data may then be converted to a 2D image, filled, and smoothed.

Next, the 2D image is matched to a template. In embodiments, the template may be predetermined, and may be stored in a database as part of a set of predetermined templates. For example, each template of the set of predetermined templates may represent a specific container type. Thus, one predetermined template may be selected as a match for the 2D image based on the container type included in the 2D image. Moreover, each template may include associated characteristics to facilitate further processing of the 2D image. For example, the matching template may contain predetermined dimensions of the container type featured in the template, such that the subsequent processing of the 2D image may incorporate those known dimensions.

Finally, the container feature assessment algorithm uses this template match to determine various features of the container. For example, the algorithm, as executed on a container feature assessment application (app), may perform segmentation on the 2D image to extract 3D features. From these 3D features, the app may determine both exterior and interior features of the container based on corresponding metrics. Subsequently, the app may generate an orientation adjustment instruction in response to assessing the exterior and interior features. The orientation adjustment instruction may indicate to an operator an adjustment to the orientation of the 3D camera for use during a shipping container loading session.

As mentioned herein, one benefit, inter alia, of the systems and methods of the present disclosure is the efficient assessment of the 3D camera's orientation. This benefit is especially discernable in large installation operations, where dozens of LMUs are installed at once. Moreover, the 3D cameras may require further orientation adjustments during shipping container loading sessions. In these instances, the systems and methods of the present disclosure enable an operator to quickly and efficiently make the necessary adjustments to the 3D camera's orientation to optimize uptimes, resulting in increased productivity, customer satisfaction, and overall system performance. Namely, instead of engaging in the traditional manual evaluation of the 3D camera's images to determine approximate orientation adjustments based on human visual assessments, the systems and methods of the present disclosure enable the operator to promptly receive a highly accurate orientation adjustment instruction in real-time.

In embodiments, 3D point cloud data process algorithm 400 may execute on one or more processors of LMU 202. Additionally or alternatively, 3D point cloud data process algorithm 400 may execute in one or more processors of server 301. For example, one or more processors may be located at a server (e.g., server 301) and may be communicatively coupled to the 3D camera via a digital network. Still further, 3D point cloud data process algorithm 400 may execute on both LMU 202 and server 301 in a client-server format, with a first portion of 3D point cloud data process algorithm 400 operating on LMU 202 and a second portion of 3D point cloud data process algorithm 400 operating on server 301.

The 3D point cloud data process algorithm 400 may be executed as part of a container feature assessment app. The container feature assessment app may be software implemented in a programming language such as Java, C#, Ruby, etc., and compiled to execute on the one or more processors of LMU 202 and/or server 301. For example, in embodiments, the container feature assessment app may include a "while" loop executing to perform one or more portions of algorithm 400 upon receipt of 3D image data from 3D camera. In such embodiments, receipt of the 3D image data would result in a "true" condition or state that would trigger the while loop to execute the one or more portions of algorithm 400. In still further embodiments, the container feature assessment app may include one or more event listeners, such as a listener function programmed within the container feature assessment app, where the listener function would receive, as a parameter, the 3D image data from 3D camera when the 3D camera captured 3D image data. In this way, the 3D camera would "push" 3D image data to the listener function which would execute algorithm 400 using the 3D image data as described herein.

More specifically, the 3D point cloud data process algorithm 400 begins at block 402, where, for example, an application (e.g., container feature assessment app) receives point cloud input. In practice, the 3D point cloud data process algorithm 400 utilizes a 3D camera (e.g., 3D camera 254 of LMU 202) configured to capture 3D image data. In various embodiments, the 3D image data is 3D point cloud data. In addition, the 3D image data may be captured periodically, such as every 30 seconds, every minute, or every two minutes, although other various rates (e.g., other frame rates) and timings are contemplated herein.

Figure 5A:
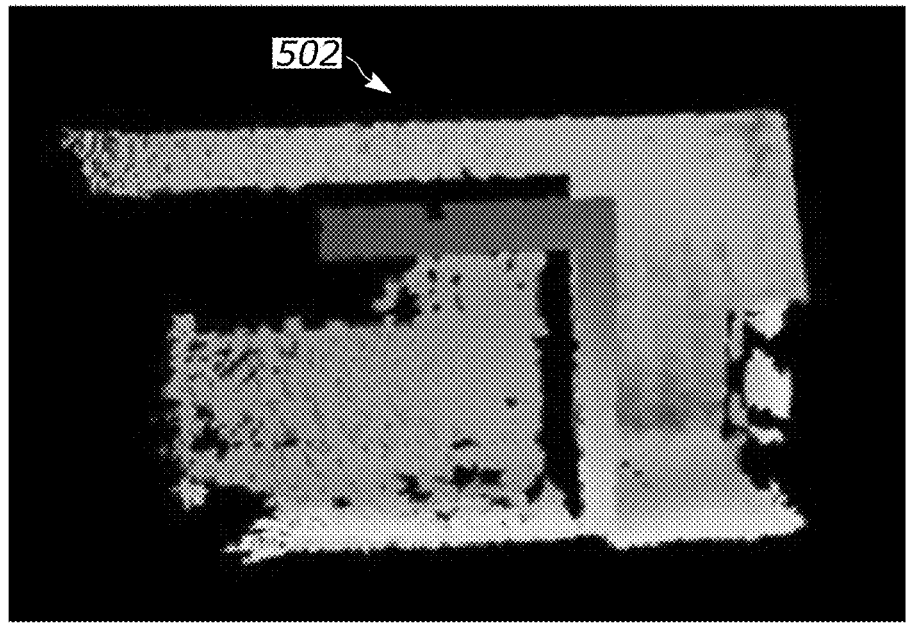
FIGS. 5A-5B illustrate example embodiments of 3D and 2D images regarding pre-processing and converting a depth image in accordance with FIG. 4, and in accordance with example embodiments herein.
Figure 5B:
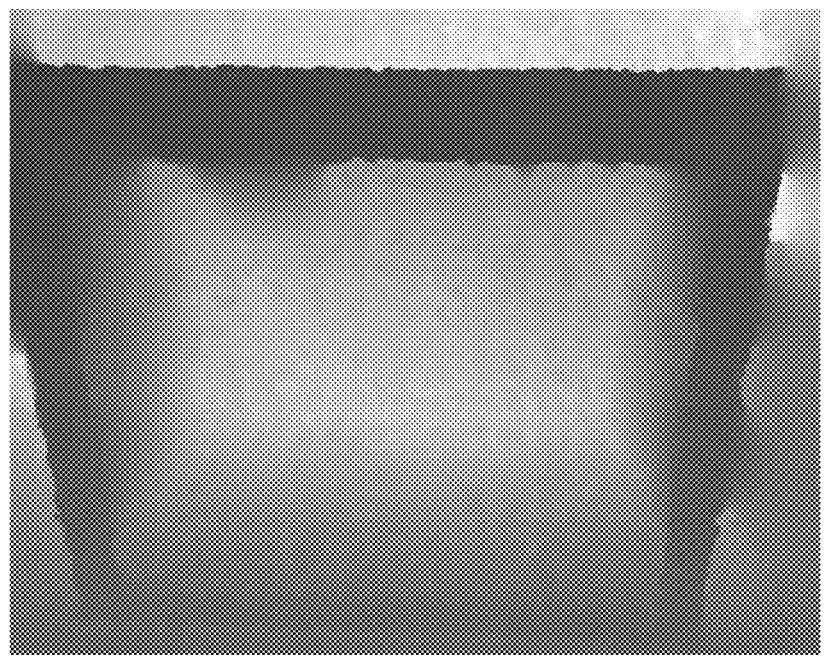

In reference to FIG. 5A, the 3D camera (e.g., of LMU 202) is generally oriented in a direction to capture 3D image data of a shipping container (e.g., shipping container 102) located in a space (e.g., space 101). The shipping container may have a particular shipping container type, such as type "AMJ" as shown for shipping container 102 of FIG. 1, or any other type as described herein or as otherwise designated as a ULD type of container.

The 3D point cloud data process algorithm 400, as part of the container feature assessment app, executing on processor(s) of LMU 202 and/or server 301, may be configured to receive the 3D image data and determine, based on the 3D image data, a container point cloud representative of the shipping container 102. FIG. 5A depicts an example embodiment of 3D image data representative of shipping container 102 as captured by 3D image camera 254 of LMU 202. As shown by FIG. 5A, 3D image data includes point cloud data 502, where point cloud data may be rendered in different colors to represent different depths or distances within the point cloud. For example, in the embodiment of FIG. 5A green represents data nearer to 3D camera 254 and blue represents data further away from 3D camera 254.

At block 404, the container feature assessment app is configured to pre-process the 3D image data. Pre-processing the data may include various actions, such as down sampling or removing outliers from the 3D image data. For example, the container feature assessment app may execute one or more instructions to remove outliers from the 3D image data by first evaluating the distances associated with each point of the 3D image data. The container feature assessment app may then compare each distance to a threshold distance to eliminate those points in the 3D image data that exceed, fall below, or otherwise fail to satisfy the threshold requirement for inclusion in the subsequent execution of the algorithm 400.

At block 406, the container feature assessment app is configured to execute on one or more processors to convert the 3D image data into 2D depth image data. In general, the container feature assessment app may convert the any portion of the 3D image data into 2D depth image data. For example, the container feature assessment app may evaluate the 3D image data during preprocessing and eliminate a portion of the 3D image data associated with background surrounding the container. Thus, and in reference to FIG. 5B, the container feature assessment app may convert a portion of the 3D image data into 2D depth image data 504.

In embodiments, the container feature assessment app may be configured to convert the 3D image data into 2D depth image data by generating the 2D depth image data as grayscale image data. For example, and as previously mentioned, the 3D image data (e.g., 3D image data 502) may be rendered in different colors to represent different depths or distances within the point cloud. Thus, when the container feature assessment app converts the 3D image data into the 2D depth image data 504, the app may remove the rendered colors to generate a grayscale image.

At block 408, the container feature assessment app is configured to execute on one or more processors to compare the 2D depth image data to one or more template image data. The one or more template image data may correspond to a respective shipping container type. For example, the one or more template image data may correspond to shipping container types including a ULD type being one of: an AMJ type, an AAD type, an AKE type, an AYY type, a SAA type, an APE type, and/or an AQF type or any combination thereof. Hence, in embodiments, the one or more template image data may correspond to one or more different ULD types.

Figure 6A:
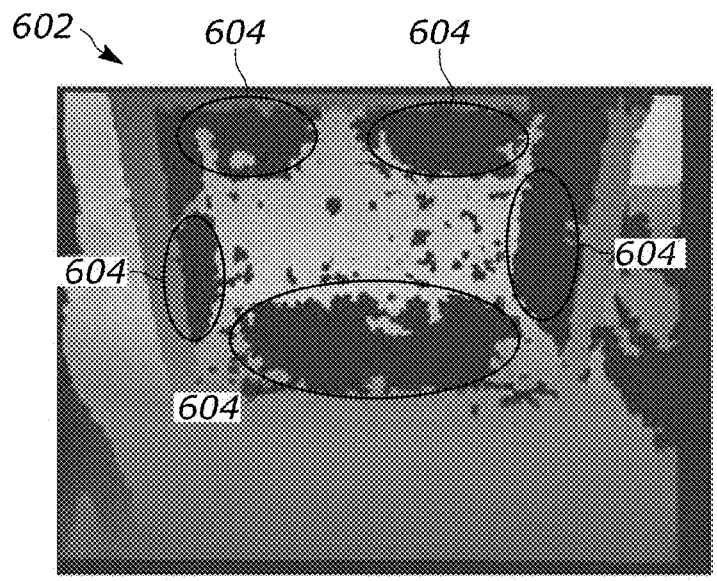
FIGS. 6A-6C illustrate example embodiments of 3D and 2D images regarding point cloud to depth image conversion in accordance with FIG. 4, and in accordance with example embodiments herein.

In embodiments, the container feature assessment app may be configured to generate the one or more template image data. Moreover, the container feature assessment app may generate the one or more template image data before or during the execution of the algorithm 400. In general, the app may receive 3D image point cloud data for a template shipping container. With reference to FIG. 6A, the app may then convert the 3D image point cloud data to a depth image data 602. As shown in FIG. 6A, the depth image data 602 may contain one or more holes 604. It is to be appreciated that the one or more holes 604 may each contain a plurality of holes. The one or more holes 604 may represent a lack of data due to, for example, reflections from the metal surface of the ULD. In any event, the one or more holes 604 present an issue because the resulting template may include portions of the depth image data 602 including the one or more holes 604. Thus, the one or more holes 604 may need to be eliminated from the depth image data 602 by including estimated data in place of the one or more holes 604.

Figure 6B:
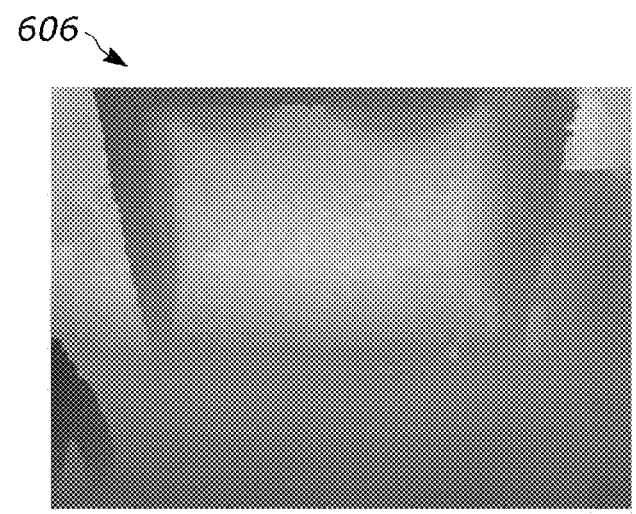

Thus, and as illustrated in FIG. 6B, the container feature assessment app may be configured to execute on one or more processors to complete the depth image data (e.g., depth image data 602). The completed depth image 606 may represent the depth image data after the container feature assessment app has completed the data. For example, the container feature assessment app may utilize a penalized least squares method to fill in the missing values in the depth image data to create the completed depth image 606. However, it should be understood that any suitable method may be used to fill in the missing data values, as represented by the one or more holes (e.g., one or more holes 604) of the depth image data.

The completed depth image 606, similar to the depth image data (e.g., depth image data 602) may be rendered in different colors to represent different depths or distances within the image 606. However, such a colored representation is non-normal and therefore may cause inconsistent outcomes if used as a template for comparison during real-time image analysis. Thus, following the container feature assessment app completing the depth image data, the completed depth image 606 may be normalized.

Figure 6C:
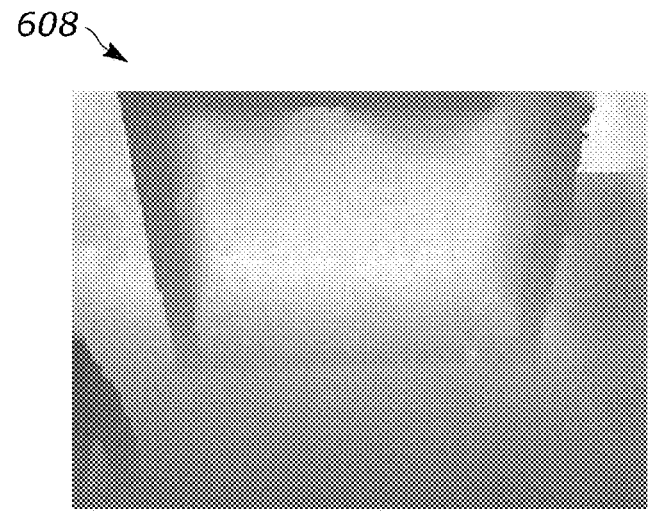

Correspondingly, the container feature assessment app may be further configured to execute on one or more processors to normalize the completed depth image 606. As illustrated in FIG. 6C, the container feature assessment app may convert the completed image (e.g., completed depth image 606) into a grayscale 2D image 608. At this point, the grayscale 2D image 608 may include a portion sufficient to create a template image. Hence, the container feature assessment app may proceed to extract a template portion from the grayscale 2D image 608.

Figure 7:
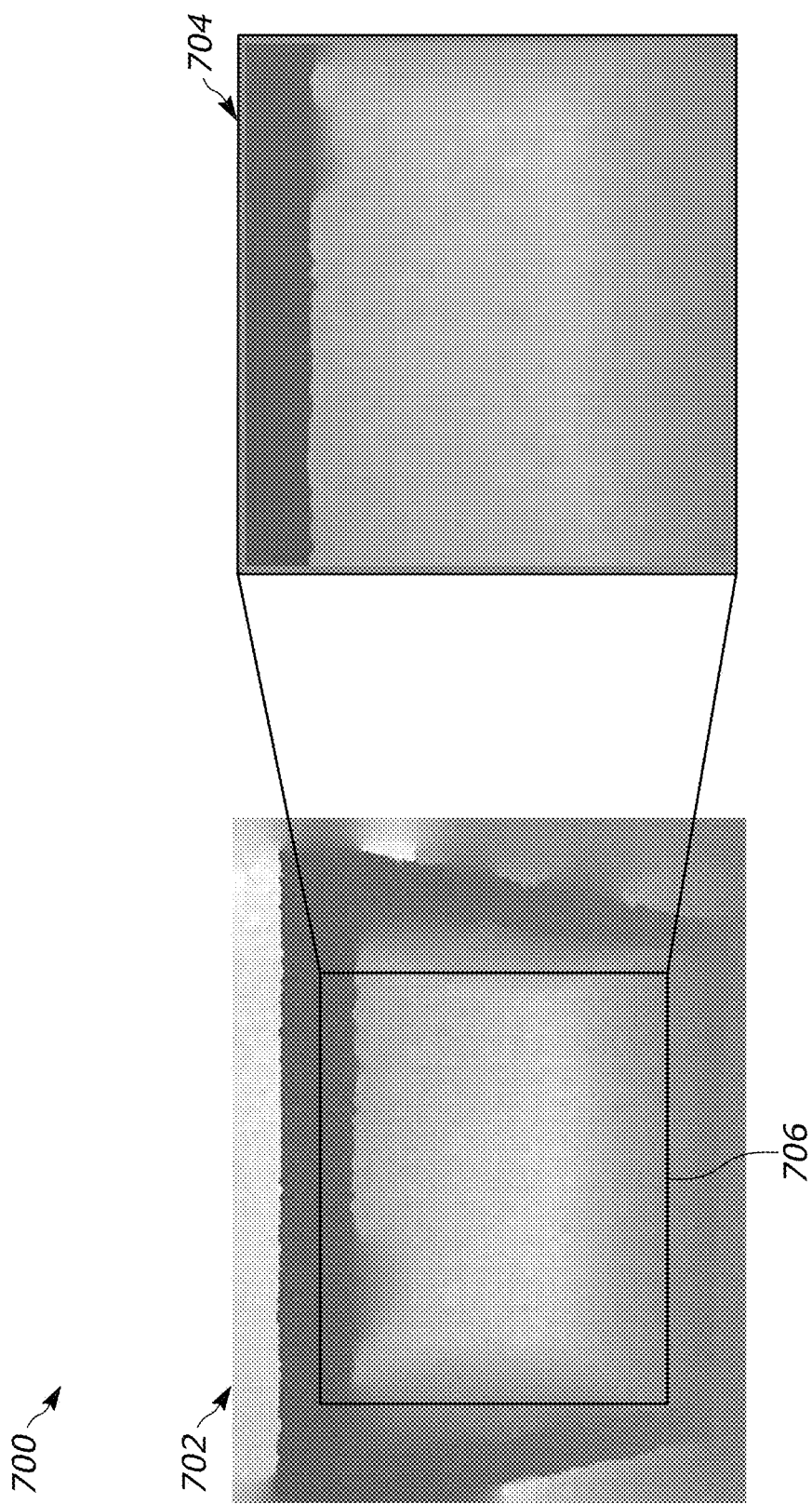
FIG. 7 illustrates an example embodiment of 2D images regarding template extraction and matching in accordance with FIG. 4, and in accordance with example embodiments herein.

As illustrated in FIG. 7, the container feature assessment app may perform a template extraction 700. The template extraction 700 includes a grayscale 2D image 702 and template image data 704. The grayscale 2D image 702 may further include a template portion 706. In practice, an operator of the LMU may determine and indicate the template portion 706, such that the container feature assessment app may store the selected template portion 706 as a standalone image (e.g., the template image data 704) for use in subsequent container feature assessments. However, in embodiments, the container feature assessment app may automatically identify the template portion 706 in the grayscale 2D image 702.

To illustrate, and regardless of how the template portion 706 is identified, the container feature assessment app may be configured to accept the template image data 704 only if the data 704 includes a portion of the top, back-wall, and/or ground plane of the container (e.g., ULD). Moreover, the container feature assessment app may be configured to accept template image data 704 only if the data 704 is centered on the portions of the top, back-wall, and/or ground planes in the horizontal dimension. In any event, the template image data 704 may be stored in memory until the container feature assessment app determines a container captured in a real-time 3D image matches the container type featured in the data 704.

Thus, the container feature assessment app may compare the template image data 704 to any 2D depth image data (e.g., grayscale 2D image 608) to determine a match. For example, the container feature assessment app may analyze the 2D depth image data by searching for portions of the 2D depth image data that match the characteristics of the template image data by a predetermined threshold amount. To illustrate, the container feature assessment app may search through the 2D depth image data to identify a portion of the 2D depth image data that includes at least 90% consistent characteristics with the template image data 704. If the container feature assessment app determines such a match exists, the container feature assessment app may verify that a container exists in the 2D depth image data and that the container is of a type consistent with the known container type of the template image data 704. Through this analysis, the container feature assessment app may identify containers within 2D depth image data with high fidelity and in various positions to yield a robust identification process.

In embodiments, the container feature assessment app may analyze the 2D depth image data to determine a portion of the data sufficient for comparison to the various stored templates (e.g., template image data 704). The container feature assessment app may analyze the 2D depth image to determine any suitable characteristics, but the app may specifically determine whether a particular portion includes a portion of the top, back-wall, and/or ground plane of the container. Similarly, the app may determine whether the particular portion is centered over the container in the horizontal dimension. Once, the app determines a portion of the 2D depth image suitable for comparison to a template, the app then determines a suitable template.

At block 410, the container feature assessment app is configured to execute on one or more processors to perform segmentation on the 2D depth image data to extract 3D point cloud features. More specifically, the container feature assessment app is configured to extract the 3D point cloud features in response to identifying a match between the 2D depth image data and one or more template image data. Namely, the app is configured to segment a ground plane and back-wall of the container from within the 2D depth image data. The app will utilize the position of the template image data to identify the ground and back-wall planes.

Figure 8A:
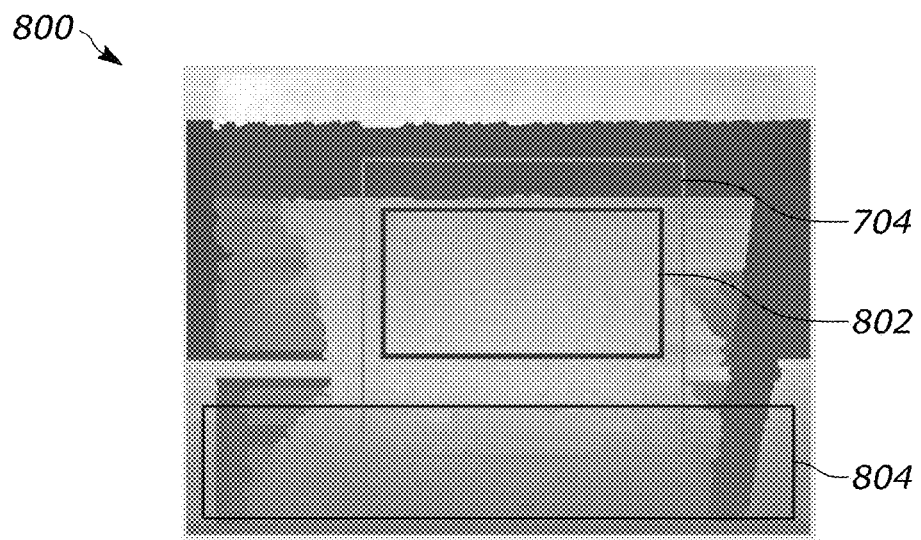
FIGS. 8A-8C illustrate example diagrams and embodiments of 3D images regarding container back-wall and ground plane segmentation and plane regression in accordance with FIG. 4, and in accordance with example embodiments herein.

For example, and as illustrated in FIG. 8A, the 2D image data 800 may be an image of a container during an LMU installation session. The container feature assessment app may apply the template image data 704 to the 2D image data 800 and determine a match between the template image data 704 and a portion of the 2D image data 800. Correspondingly, the container feature assessment app may determine positions of the back-wall 802 and ground plane 804 based on the position identified as matching the template image data 704.

At block 412, the container feature assessment app may be configured to extract 3D point cloud features from the segmented back-wall 802 and ground plane 804 through a regression algorithm. In embodiments, the container feature assessment app may be configured to extract the 3D point cloud features by feeding the back-wall 802 and ground plane 804 into a plane regression pipeline, such that the plane regression pipeline serves as the regression algorithm. The plane regression pipeline may analyze the segmented back-wall 802 and ground plane 804 portions and determine a set of 3D point cloud data corresponding to each one.

Figure 8B:
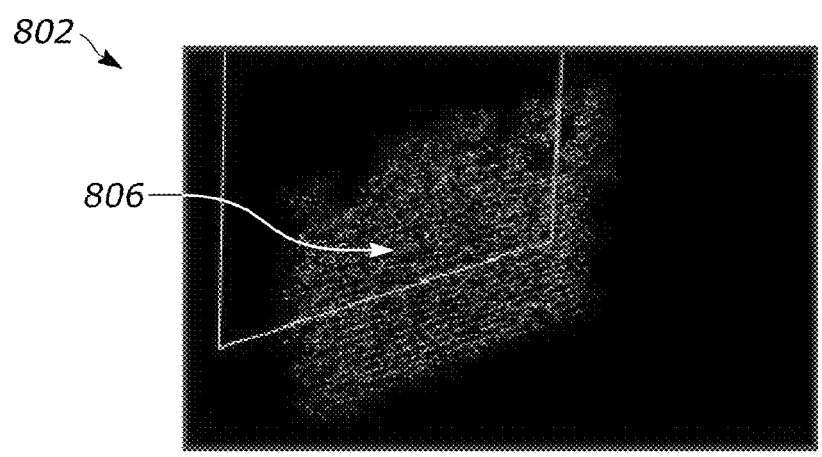

For example, and as illustrated in FIG. 8B, the plane regression pipeline may analyze the back-wall 802 segment to determine a back-wall 3D point cloud 806. The back-wall 3D point cloud 806 may be a 3D representation of the back-wall of the container, as extracted from 2D image data (e.g., 2D image data 800). Thus, the back-wall 3D point cloud 806 may include characteristics of the physical back-wall of the shipping container (e.g., curvature, height, width, depth, etc.).

Figure 8C:
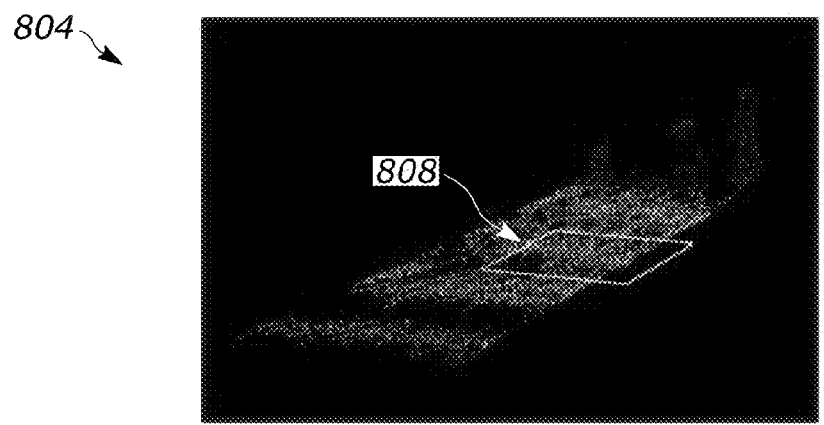

Similarly, and as illustrated in FIG. 8C, the plane regression pipeline may analyze the ground plane 804 segment to determine a ground plane 3D point cloud 808. The ground plane 3D point cloud 808 may be a 3D representation of the ground plane of the container, as extracted from 2D image data (e.g., 2D image data 800). Thus, the ground plane 3D point cloud 808 may include characteristics of the physical ground plane of the shipping container (e.g., curvature, length, width, depth, etc.).

Moreover, the container feature assessment app may be further configured to estimate the orientation of the camera during the regression algorithm. For example, the app may perform the regression algorithm (e.g., plane regression pipeline) and determine that the resulting 3D point clouds (e.g., back-wall 3D point cloud 806 and ground plane 3D point cloud 808) are not oriented with respect to the camera such that the remainder of the algorithm 400 may be successfully completed. As an example, if the app determines that the ground plane and back-wall are askew with respect to the orientation of the camera, the app may further determine that analyzing the front panel of the container will be significantly complicated (and/or erroneously analyzed) due to the misalignment.

Thus, at block 414, the container feature assessment app may be configured to execute on one or more processors to rotate the 3D point clouds (e.g., back-wall 3D point cloud 806 and ground plane 3D point cloud 808). For example, the container feature assessment app may rotate the 3D point clouds such that, after the rotation, the 3D point clouds are more directly aligned with the line-of-sight (LOS) of the camera, oriented at an angle that is optimal for subsequent analysis, and/or any other suitable rotation or combination thereof. In this manner, and as mentioned herein, rotating the 3D point clouds may serve to make the subsequent computations more straightforward.

At block 416, the container feature assessment app is configured to execute on one or more processors to localize a back-wall and a front panel of the container (e.g., shipping container 102). Generally speaking, the app may perform routines consistent with the algorithm 400 to accurately determine the position of the back-wall and front panel of the container in 3D space. These routines may include analysis of the rotated 3D point clouds, as described in FIG. 8C. In reference to FIG. 9A, the container feature assessment app may perform this analysis in a manner that can be visualized similar to the schematic diagram 900. The diagram features the LMU 202 having a field-of-view (FOV) composed of a back-wall search region 902 and a ground search region 904.

For example, the back-wall search region 902 may include a portion of the container similar to the segmented back-wall (e.g., segmented back-wall 802). More specifically, the back-wall search region 902 may include a portion of the container (e.g., shipping container 102) representing the back wall 906 of the container. Thus, the container feature assessment app may execute routines via the one or more processors to prioritize the back-wall search region 902 to capture data identifiable with the back wall 906 of the container. In this manner, the container feature assessment app may simplify the analysis process, resulting in a more streamlined and efficient segmentation/regression of the container, and the algorithm 400 in general.

Similarly, the ground search region 904 may include a portion of the container similar to the segmented ground plane (e.g., segmented ground plane 804). More specifically, the ground search region 904 may include a portion of the container (e.g., shipping container 102) representing the bottom 908 of the container. Thus, the container feature assessment app may execute routines via the one or more processors to prioritize the ground search region 904 to capture data identifiable with the bottom 908 of the container. In this manner, the container feature assessment app may simplify the analysis process, resulting in a more streamlined and efficient segmentation/regression of the container, and the algorithm 400 in general.

Moreover, the container feature assessment app may accurately localize the front panel 910 of the container once the back-wall 906 and bottom 908 have been localized. Each container type represented by a corresponding template image may include a back-wall height 912 and a bottom distance 914. Thus, once the app localizes the back-wall 906 and bottom 908, the app may compare these localized features (906, 908) to the known dimensions (912, 914).

As an example, the container feature assessment app may utilize the data obtained via the back-wall search region 902 and the ground search region 904 to perform dimensional analysis of the container. Once the app receives data representative of the back-wall 906 and bottom 908, the app may analyze the data to determine the back wall height 912 and the bottom distance 914. In embodiments, both the back wall height 912 and the bottom distance 914 may be known quantities based on the container type (e.g., AMJ type, AAD type, AKE type, AYY type, SAA type, APE type, AQF type, etc.).

Particularly, the app may compare the bottom distance 914 to the depth components of the localized features (906, 908) to determine where the front panel 910 is likely located. Moreover, the app may compare the back-wall height 912 to the localized features (906, 908) to determine where the top of the front panel 910 is likely located. Correspondingly, the app may extract an estimated front panel based on the relations between the localized features (906, 908) and the known dimensions (912, 914).

Figure 9A:
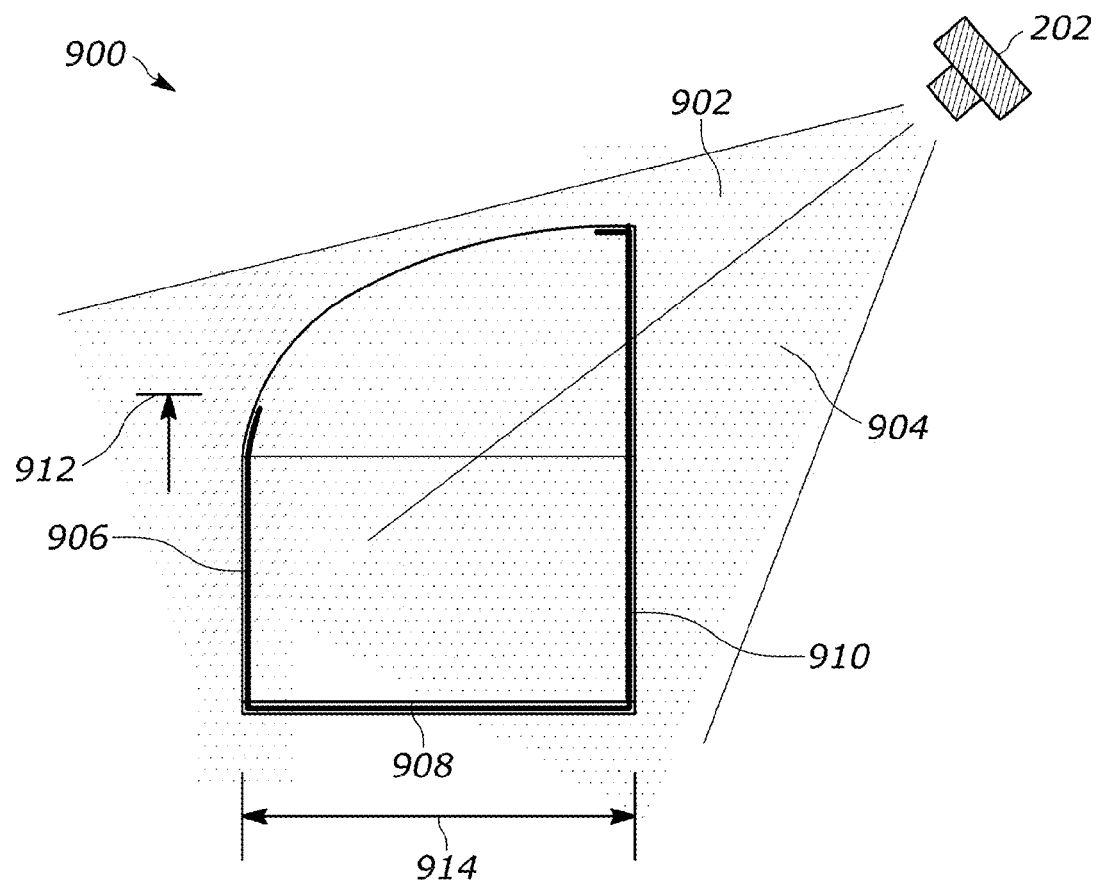
FIGS. 9A-9B illustrate example embodiments of 3D and 2D images regarding front plane segmentation in accordance with FIG. 4, and in accordance with example embodiments herein.
Figure 9B:
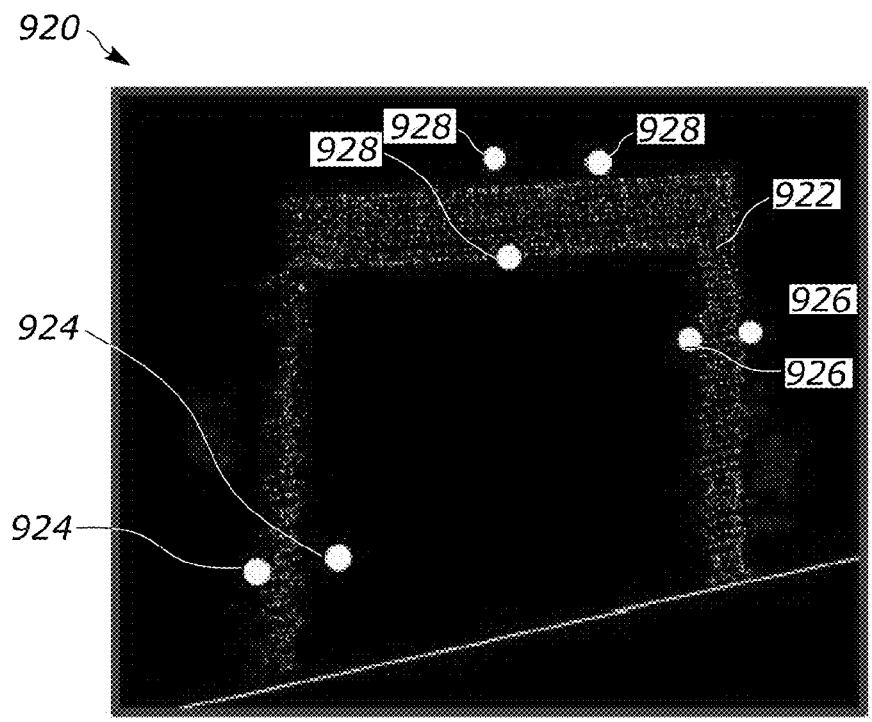

At block 418, and in reference to FIG. 9B, the container feature assessment app may be configured to execute on one or more processors to perform a back-wall (e.g., back-wall 906) and front panel (e.g., front panel 910) plane regression. Similar to block 412, the plane regression performed by the container feature assessment app at block 418 may feed the data representative of the back-wall and the front panel through a regression algorithm. In embodiments, the container feature assessment app may be configured to extract 3D point cloud features corresponding to the back-wall and/or the front panel by feeding the back-wall and front panel data into a plane regression pipeline, such that the plane regression pipeline serves as the regression algorithm. The plane regression pipeline may analyze the data representative of the back-wall and front panel to determine a set of 3D point cloud data corresponding to each one.

In embodiments, the container feature assessment app may be configured to only perform a plane regression with respect to the front panel at block 418. For example, the container feature assessment app may be configured to utilize the 3D point cloud data corresponding to the back-wall (e.g., back-wall 3D point cloud 806) generated at block 412 to suffice for all or a portion of the algorithm 400. Regardless, the plane regression performed by the container feature assessment app with respect to the front panel may yield a 3D point cloud representation of the front panel 910.

For example, the container feature assessment app may localize and perform a plane regression with respect to the front panel, yielding a front panel data 3D representation 920. The representation 920 may include a front panel 3D point cloud 922. Moreover, the representation 920 may include a set of bounding points. The set of bounding points may include a set of left bounding points 924, a set of right bounding points 926, and a set of top bounding points 928. Each set of the set of bounding points may correspond to a portion of the front panel. For example, the set of left bounding points 924 may correspond to the left portion of the front panel. Each set of the set of bounding points may partially and/or completely define the regions of interest in a completeness analysis, in accordance with embodiments described herein.

At this point, the container feature assessment app has determined 3D point cloud features corresponding to the back-wall of the container (e.g., back-wall 3D point cloud 806), the ground panel of the container (e.g., ground plane 3D point cloud 808), and the front panel of the container (e.g., front panel 3D point cloud 922). Using these three 3D point clouds, the container feature assessment app may be configured to determine various features of the container using an exterior metric and an interior metric. The metrics may be any suitable evaluation metrics, and it is to be understood that the app may utilize any suitable number and/or combination of evaluation metrics to make the exterior and interior features determinations.

Namely, at block 420, the container feature assessment app may be configured to execute on one or more processors to perform a completeness analysis with respect to the front panel. In embodiments, the completeness analysis may be the exterior metric the app uses to determine exterior features of the container. For example, and in reference to FIG. 10, the container feature assessment app may render the 3D point cloud data representative of the front panel (e.g., front panel 3D point cloud 922) into a 2D format 1000. The 2D format may include a left side portion 1002, a right side portion 1004, and a top edge portion 1006.

Generally speaking, each of the portions (1002, 1004, and 1006) may include 2D data representative of the analogous portions of the front panel (e.g., the front panel 3D point cloud 922 data as bounded by the set of left bounding points 924, the set of right bounding points 926, and the set of top bounding points 928). By including the 3D point cloud data representative of the front panel into the respective portions, the app may determine a completeness ratio of the data associated with each portion (e.g., 1002, 1004, and 1006) by evaluating the amount of received data in any particular portion (e.g., the number of points included in the target point cloud region (e.g., 924, 926, 928)) with respect to the amount of received data in multiple portions.

Figure 10:
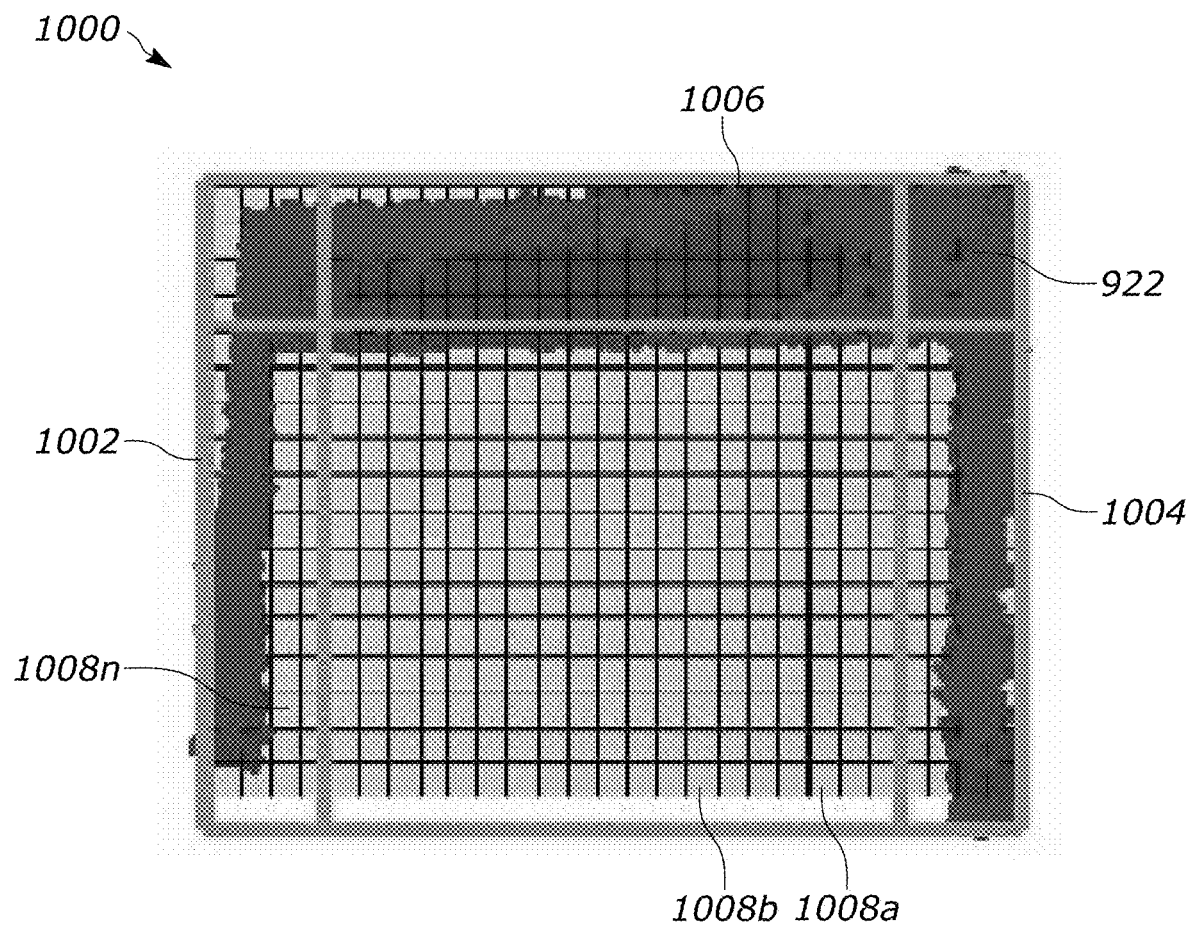
FIG. 10 illustrates an example embodiment of a 2D image regarding a front panel completeness analysis in accordance with FIG. 4, and in accordance with example embodiments herein.

For example, the 2D format 1000 may include a set of evaluation portions 1008a-1008n, where n may be any suitable number of evaluation portions. Each portion of the set of evaluation portions 1008a-1008n may include a set of data corresponding to the front panel of the container. The left side portion 1002 may include, for example, 52 individual evaluation portions 1008a-1008n. As shown in FIG. 10, the front panel data (e.g., 2D data extracted from the front panel 3D point cloud 922 data) included in the left side portion 1002 may represent the left side of the front panel. The front panel data representative of the left side of the front panel covers a portion of the left side portion 1002, but several individual evaluation portions (e.g., 1008n) may not include data representative of the left side of the front panel. Similarly, the front panel data included in the right side portion 1004 may represent the right side of the front panel. The front panel data representative of the right side of the front panel covers a portion of the right side portion 1004, but several individual evaluation portions may not include data representative of the right side of the front panel.

However, the amount of data available for a given container type may be insufficient to fill any portion (1002, 1004, and 1006), so the completeness ratios may be calculated based on the relative number of data points acquired for any given side of the front panel. To evaluate the completeness ratios, the container feature assessment app may perform calculations consistent with the following:

$$R_l = \frac{n_l}{n_l + n_r}, \quad (1)$$

$$R_r = \frac{n_r}{n_l + n_r}, \quad (2)$$

$$R_u = \frac{n_u}{n_l + n_r + n_u}, \quad (3)$$

where $n_l$, $n_r$, and $n_u$ may represent the number of front panel data points included in the left side portion 1002, the right side portion 1004, and the top edge portion 1006, respectively. Moreover, $R_l$, $R_r$, and $R_u$ may represent the completeness ratios with respect to the left side portion 1002, the right side portion 1004, and the top edge portion 1006, respectively.

Thus, as mentioned and as indicated in each of the equations (1, 2, and 3), the completeness ratios may depend on the relative number of points acquired for each side of the front panel. To illustrate, the container feature assessment app may be configured to evaluate whether enough of the front panel has been captured to make a valid assessment of the exterior features of the container. This evaluation may require determining whether a particular portion of the container (e.g., the left side) includes more data than another portion of the container (e.g., the right side).

For example, assume the left side portion 1002 includes a large volume of data indicative of the left side of the container, and the right side portion 1004 includes a significantly smaller volume of data indicative of the right side of the container. In this example, the container feature assessment app may determine that the camera was not oriented correctly with respect to the container when acquiring the image data of the container. The app may further conclude that the orientation of the camera should be adjusted such that the camera is oriented more to the right. In this manner, the camera may acquire a larger volume of data representative of the right side of the container in subsequent image captures, such that the app may adequately determine exterior features of the container.

Consequently, and in embodiments, the app may compare each completeness ratio to a completeness ratio threshold. If the app determines that the completeness ratio for a particular side exceeds, is insufficient, or otherwise does not satisfy the completeness ratio threshold, the app may generate an orientation instruction based on that determination, as described further herein. Regardless, once the completeness ratios have been computed, and the app determines that a satisfactory number of data points have been collected and evaluated for the front panel, the app may then determine the interior features of the container.

Figure 11A:
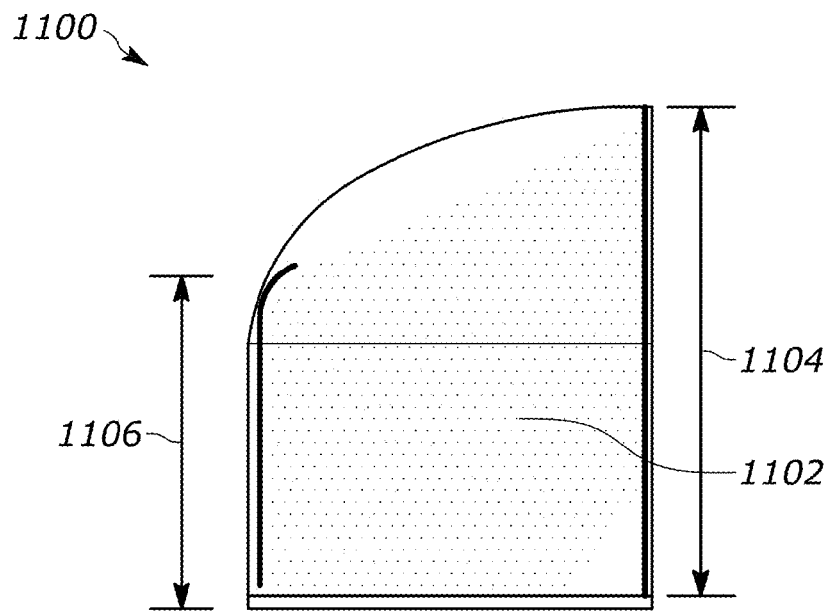
FIGS. 11A-11B illustrate example diagrams and embodiments of 3D images regarding front panel and back wall height estimation and back wall occlusion computation in accordance with FIG. 4, and in accordance with example embodiments herein.

Determining the interior features may begin at block 422, where the container feature assessment app may be configured to execute on one or more processors to estimate the height of the front panel and back-wall of the container. As illustrated in FIG. 11A, the app may perform this estimation in a manner that can be visualized similar to the schematic diagram 1100. The diagram 1100 includes a visible area 1102, a front height 1104, and a back-wall height 1106. The visible area 1102 may correspond to the FOV of the camera (e.g., LMU 202). Moreover, as mentioned herein and in embodiments, the container feature assessment app may receive the back-wall height 1106 in connection with a matching image template (e.g., template image data 704) for the 2D data representative of the container.

In embodiments, the container feature assessment app may be configured to execute on one or more processors to determine the front height 1104 and the back-wall height 1006. The app may determine these heights based on any suitable metric, but in embodiments may determine the front height 1104 and back-wall height 1006 based on an analysis of points associated with the front panel and back-wall, respectively.

Figure 11B:
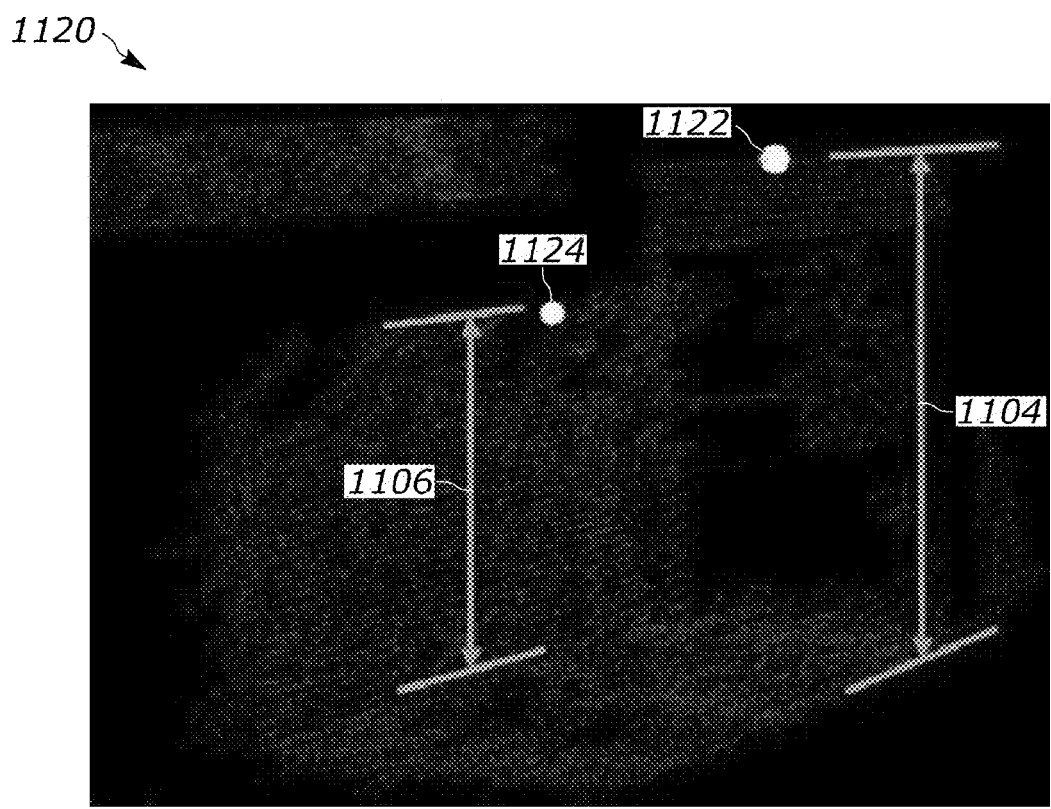

For example, and in reference to FIG. 11B, the app may evaluate the front height 1104 and back-wall height 1106 in a composite 3D representation 1120. The app may further designate points within the representation 1120 to make the height estimations. The app may assign a front panel highest point 1122 indicative of the highest point in a lateral dimension associated with the front panel of the container.

Similarly, the app may assign a back-wall highest point 1124 indicative of the highest point in a lateral dimension associated with the back-wall of the container. Using these points (1122, 1124), the app may estimate the front height 1104 and back-wall height 1106 by evaluating height coordinates for each point (1122, 1124), comparing the points (1122, 1124) to dimensions associated with the container type, and/or any other suitable estimation technique or combination thereof.

In any event, and as indicated at block 424, once the app determines estimated values for the front height 1104 and the back-wall height 1106, the app may calculate an occlusion ratio for the acquired data. Generally, the occlusion ratio indicates an amount of the container that is obscured from the FOV of the camera (e.g., LMU 202). The occlusion ratio may be defined as:

$$R_o = \frac{H_b}{H_f}, \quad (4)$$

where $H_b$ and $H_f$ indicate the back-wall height 1106 and front height 1004, respectively; and $R_o$ indicates the occlusion ratio. More specifically, the occlusion ratio may be inversely proportional to the amount of the container that is obscured from the FOV of the camera. To illustrate, assume the back-wall height 1106 is 10 feet, and that the front height 1104 is 1 foot. In this situation, the occlusion ratio would be 10:1, or simply 10. Thus, the FOV of the camera would be obscured to a large portion of the container interior because the top edge of the front panel would be significantly shorter than the top edge of the back-wall.

Consequently, to ensure that the camera may adequately image and analyze the interior of each container, for example, during loading sessions, the app may compare the occlusion ratio to an occlusion ratio threshold. If the app determines that the occlusion ratio for a particular container exceeds, is insufficient, or otherwise does not satisfy the occlusion ratio threshold, the app may generate an orientation instruction based on that determination, as described further herein.

At block 426, the container feature assessment app may be configured to execute on one or more processors to verify the visibility and occlusion statuses of the container. For example, the app may verify that the completeness ratios and the occlusion ratio satisfy any associated threshold values, such that the app may begin creating a 3D bounding box for the container.

Figure 12A:
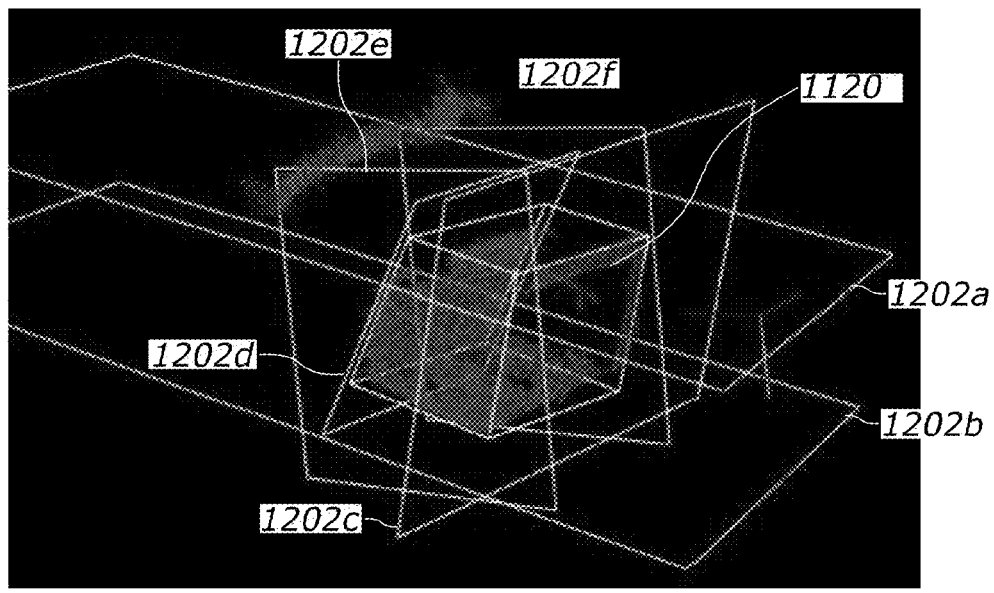
FIGS. 12A-12B illustrate example embodiments of 3D images regarding ULD visibility and occlusion status creation and ULD 3D bounding box creation in accordance with FIG. 4, and in accordance with example embodiments herein.

In reference to FIG. 12A, the app may begin determining a bounding box by generating a 3D representation 1200 of the container data. For example, the representation 1200 may include the composite 3D representation 1120 of the container 3D point cloud data, and a set of planes 1202a-1202f that the app may fit to the composite 3D representation 1120.

In embodiments, the app may fit each plane of the set of planes 1202a-1202f based on a fitting algorithm. The fitting algorithm may begin fitting the set of planes 1202a-1202f to the representation 1120 based on assumptions, such as that the left plane 1202e and the right plane 1202f are vertical with respect to the front plane 1202c and the ground plane 1202b. Based on the acquired 3D point cloud data for the container (e.g., back-wall 3D point cloud 806, ground plane 3D point cloud 808, and front panel 3D point cloud 922), in conjunction with the assumptions made by the fitting algorithm, the app may fit the set of planes 1202a-1202f to the 3D point cloud data. The app may place each plane of the set of planes 1202a-1202f as close to each corresponding side of the container until the respective plane touches one or more points in the respective point cloud. However, it should be understood that the app may fit each plane of the set of planes 1202a-1202f in any suitable fashion. Moreover, it is to be appreciated that the app may fit any suitable number of planes to the 3D point cloud data.

Figure 12B:
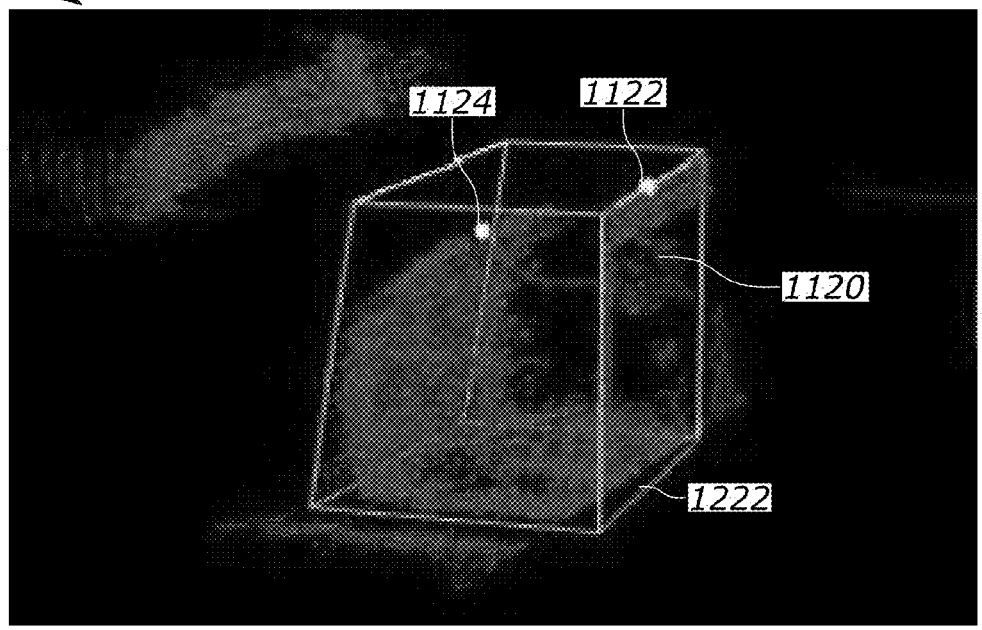

Nevertheless, once the container feature assessment app fits the six planes comprising the set of planes 1202a-1202f to the 3D point cloud data, the app may further determine a bounding box associated with the 3D point cloud data. For example, and as illustrated in FIG. 12B, the container feature assessment app may generate a 3D representation 1220 including the composite 3D representation 1120, and a bounding box 1222. The bounding box 1222 may be representative of portions of the six planes generated as part of the fitting process (e.g., set of planes 1202a-1202f). In embodiments, the bounding box 1222 may include the front panel highest point 1122 and the back-wall highest point 1124, and/or the app may determine the bounding box 1222 based, in part, on the location and values of the points (1122, 1124).

Generally speaking, after the container feature assessment app evaluates the exterior and interior features of the container, the app may generate an orientation adjustment instruction. The orientation adjustment instruction may indicate to an operator to orient the 3D camera (e.g., LMU 202) from the first direction of the camera to a second direction. The second direction of the camera may be different from the first direction of the camera. Moreover, the second direction of the camera may be for use during a shipping container loading session. Thus, the second direction may place the camera in an orientation such that the camera may adequately image each subsequent container placed in the FOV of the camera to perform satisfactory container analytics.

In embodiments, the orientation adjustment instruction may be generated in response to the container feature assessment app determining the bounding box. The orientation adjustment instruction may include at least one of an orientation to right instruction, an orientation to left instruction, a lower/raise instruction, and a tilt up/down instruction. Thus, the app may generate an instruction indicating to an operator that the camera is tilted too far down, and should be tilted up to place the camera in a more satisfactory orientation to perform container analytics.

In embodiments, the container feature assessment app may communicate with an installation visualization app. The installation visualization app may execute on a client device implementing a graphical user interface (GUI). The GUI may graphically indicate the orientation adjustment instruction on a digital display of the client device. For example, the GUI may display the orientation adjustment instruction as an arrow indicating the direction of adjustment intended by the orientation adjustment instruction. However, it should be understood that the graphical indication of the orientation adjustment instruction may include any alphanumeric character, symbol, image, video, and/or any other suitable indication or combination thereof.

Further in these embodiments, the installation visualization app may be configured to display the orientation adjustment instruction on a heads up display (HUD) communicatively coupled to the 3D camera via a digital network. The installation visualization app may also comprise an installation voice instruction app. The installation voice instruction app may execute on a client device implementing a speaker for audibly communicating the orientation adjustment instruction to the operator of the client device. Thus, the container feature assessment app may communicate the orientation adjustment instruction to the installation voice instruction app, which may then audibly communicate the orientation adjustment instruction to the operator.

In embodiments, the client device may implement the installation visualization app to receive the image data and/or the post-scanning data and display such data, e.g., in graphical or other format, to a manager or loader to facilitate the unloading or loading of packages (e.g., 104, 107, etc.), as described herein. In some embodiments, the installation visualization app may be implanted as part of Zebra Technologies Corps.'s SmartPack™ container loading analytics (CLA) solution. The installation visualization app may be installed on client devices operating in loading and shipping facilities (e.g., a loading facility as depicted by FIG. 1). The installation visualization app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device.

In embodiments, the installation visualization app may receive the image data/datasets and/or the post-scanning data and display such data in real-time. The client device may be a mobile device, such as a tablet, smartphone, laptop, or other such mobile computing device. The client device may implement an operating system or platform for executing the dashboard (or other) apps or functionality, including, for example, any of the Apple iOS platform, the Google Android platform, and/or the Microsoft Windows platform. The client device may include one or more processors and/or one or more memories implementing the dashboard app or for providing other similar functionality. The client device may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

Generally, as would be understood by one of skill in the art from the present disclosure, certain benefits accrue from the techniques and features described herein. The 3D depth imaging systems and methods described herein provide a feature assessment technique to determine an initial orientation configuration (e.g., generate any necessary orientation adjustment instructions) for a further dynamic auto-orientation purpose during subsequent analyses, as necessary. In addition, the 3D depth imaging systems and methods described herein allow for segmentation and regression fitting of a target container's front panel, back-wall, and ground panel based on the acquired 3D depth image data.

The 3D depth imaging systems and methods described herein provide completeness ratio and occlusion ratio determination techniques, as part of algorithm 400, that accurately estimates ULD visibility with respect to the LMU. In addition, the 3D depth imaging systems and methods described herein include a unique technique for fitting bounding planes to the top, bottom, left, right, front, and back edges of the container based on an outside-to-inside approach which is robust for various types/shapes of containers. Further, the 3D depth imaging systems and methods described herein provide a technique for automatically generating orientation adjustment instructions of the camera, based on the exterior and interior features analysis. These orientation adjustment determinations were traditionally performed manually, and thus were generally inaccurate and time-consuming. Consequently, the 3D depth imaging systems and methods described herein greatly reduce the time required to accurately orient the imaging system in order to perform advanced container analytics.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A non-transitory computer-readable medium storing computer-readable instructions that, when executed by a one or more processors, causes a mobile device to execute a container feature assessment application (app), the mobile device configured to receive three-dimensional (3D) image data captured by a 3D-depth camera, the 3D-depth camera oriented in a first direction to capture the 3D image data of a shipping container located in a space, the shipping container having a shipping container type, the container feature assessment app being configured to:
   execute on the one or more processors and to receive the 3D image data, the container feature assessment app configured to determine, based on the 3D image data, a container point cloud representative of the shipping container,
   wherein the container feature assessment app is further configured to execute on the one or more processors to:
   (a) convert the 3D image data into two-dimensional (2D) depth image data;
   (b) compare the 2D depth image data to one or more template image data, each of the one or more template image data corresponding to a respective shipping container type;
   (c) in response to a match between the 2D depth image data and the one or more template image data, perform segmentation to extract 3D point cloud features;
   (d) from the 3D point cloud features, determine exterior features of the shipping container and assess the exterior features using an exterior features metric;
   (e) from the 3D point cloud features, determine interior features of the shipping container and assess the interior features using an interior features metric; and
   (f) in response to assessing the exterior features and assessing the interior features, generate an orientation adjustment instruction for indicating to an operator to orient the 3D-depth camera in a second direction for use during a shipping container loading session, wherein the second direction is different than the first direction.

2. The non-transitory computer-readable medium of claim 1, wherein the container feature assessment app is further configured to convert the 3D image data into 2D depth image data by generating the 2D depth image data as grayscale image data, and wherein the container feature assessment app is further configured to compare the 2D depth image data to the one or more template image data in grayscale to identify a template matching portion.

3. The non-transitory computer-readable medium of claim 2, wherein the container feature assessment app is further configured to execute on the one or more processors to:
   receive 3D image point cloud data for a template shipping container,
   convert the 3D image point cloud data to a depth image data,
   apply a penalized least squares process to introduce missing data into the depth image data and generate a template depth image, and
   normalize the template depth image to a grayscale to generate the template image data.

4. The non-transitory computer-readable medium of claim 2, wherein the container feature assessment app is further configured to execute on the one or more processors to:
   segment the 3D image data into a shipping container ground plane and a shipping container back wall based on the template matching portion; and
   feed the shipping container ground plane and the shipping container back wall to a plane regression pipeline and determine and segment a shipping container front plane,
   wherein the 3D point cloud features comprise the shipping container ground plane, the shipping container back wall, and the shipping container front plane.

5. The non-transitory computer-readable medium of claim 4, wherein the container feature assessment app is further configured to assess the exterior features using the exterior features metric by: dividing the shipping container front plane into a left side portion, a right side portion, and a top edge portion, determining completeness ratios for each of the left side portion, the right side portion, and the top edge portion, and determining, from the completeness ratios, a completeness of the shipping container front plane as the exterior features metric.

6. The non-transitory computer-readable medium of claim 5, wherein the container feature assessment app is further configured to assess the interior features using the interior features metric by: determining a height of the shipping container front plane, determining a height of the shipping container back wall, and determining an occlusion ratio as the interior features metric.

7. The non-transitory computer-readable medium of claim 6, wherein the container feature assessment app is further configured to execute on the one or more processors to:
   determine six planes of the shipping container;
   determine a bounding box of the shipping container based on the six planes; and generate the orientation adjustment instruction in response to determining the bounding box, the orientation adjustment instruction comprising at least one of an orientation to right instruction, an orientation to left instruction, a lower/raise instruction, and a tilt up/down instruction.

8. The non-transitory computer-readable medium of claim 1, wherein the 3D-depth camera and the one or more processors are housed in a load monitoring unit (LMU).

9. The non-transitory computer-readable medium of claim 1, wherein the one or more template image data corresponds to one or more different universal loading device (ULD) types.

10. The non-transitory computer-readable medium of claim 1, further comprising an installation visualization app, the installation visualization app executing on a client device implementing a graphical user interface (GUI), the GUI graphically indicating the orientation adjustment instruction on a digital display of the client device.

11. The non-transitory computer-readable medium of claim 10, wherein the installation visualization app is configured to display the orientation adjustment instruction on a heads up display (HUD) communicatively coupled to the 3D-depth camera via a digital network.

12. The non-transitory computer-readable medium of claim 1, further comprising an installation voice instruction app, the installation voice instruction app executing on a client device implementing a speaker for audibly communicating the orientation adjustment instruction to the operator of the client device.

* * * * *